United States Patent
Vassen et al.

(10) Patent No.: US 7,585,575 B2
(45) Date of Patent: Sep. 8, 2009

(54) HEAT-INSULATING LAYER MADE OF COMPLEX PEROVSKITE

(75) Inventors: Robert Vassen, Herzogenrath (DE); Sigrid Schwartz-Lueckge, Heinsberg-Randerath (DE); Wolfgang Jungen, Eschweiler (DE); Detlev Stoever, Niederzier (DE)

(73) Assignee: Forschungszentrum Julich GmbH, Julich (DE)

( * ) Notice: Subject to any disclaimer, the term of this patent is extended or adjusted under 35 U.S.C. 154(b) by 0 days.

(21) Appl. No.: 12/339,195

(22) Filed: Dec. 19, 2008

(65) Prior Publication Data

US 2009/0098390 A1    Apr. 16, 2009

Related U.S. Application Data

(62) Division of application No. 10/518,155, filed as application No. PCT/DE03/01924 on Jun. 10, 2003, now Pat. No. 7,468,213.

(30) Foreign Application Priority Data

Jun. 13, 2002   (DE) .................... 102 26 295

(51) Int. Cl.
*B32B 18/00* (2006.01)
(52) U.S. Cl. .............. 428/701; 416/241 R; 416/241 B; 428/469; 428/471; 428/472.2; 428/633; 428/649; 428/650; 428/680; 428/681; 428/702; 427/453
(58) Field of Classification Search ................ None
See application file for complete search history.

(56) References Cited

U.S. PATENT DOCUMENTS 6,821,656 B2 * 11/2004 Dietrich et al. ............ 428/701

\* cited by examiner

*Primary Examiner*—John J. Zimmerman
*Assistant Examiner*—Aaron Austin
(74) *Attorney, Agent, or Firm*—Andrew Wilford

(57) ABSTRACT

A heat-insulating layer has a melting point above 2500° C., a thermal expansion coefficient in excess of $8 \times 10^{-6}$ $K^{-1}$, and a sintering temperature greater than 1400° C. This material has a perovskite structure of the general formula $A_{1+r}(B'_{1/2+x}B''_{1/2+y})O_{3+z}$ in which:
A=at least one element of the group (Ba, Sr, Ca, Be),
B'=at least one element of the group (Al, La, Nd, Gd, Er, Lu, Dy, Tb),
B''=at least one element of the group (Ta, Nb), and $0.1<r, x,y,z<0.1$.

4 Claims, No Drawings

HEAT-INSULATING LAYER MADE OF COMPLEX PEROVSKITE

CROSS REFERENCE TO RELATED APPLICATION

This application is a division of application Ser. No. 10/518,155 filed 20 Jul. 2005, now U.S. Pat. No. 7,468,213 which is the U.S. national phase of PCT application PCT/DE03/001924 filed 10 Jun. 2003 with a claim to the priority of German patent application 10226295.0 itself filed 13 Jun. 2002, whose entire disclosures are herewith incorporated by reference.

FIELD OF THE INVENTION

The invention relates to a heat-insulating layer which is made from a complex perovskite.

STATE OF THE ART

To increase the efficiency of stationary and flying gas turbines increasingly higher gas temperatures are today required in such machines. For this purpose components of the turbine are provided with heat-insulating layers (HIL) which as a rule are comprised of yttrium stabilized zirconium oxide (YSZ). An adhesion promoting layer (APL) of a MCrAlY alloy (M=Co, Ni) or an aluminide layer between the substrate and the heat-insulating layer serves mainly for protecting the substrate against oxidation. With this system, surface temperatures of the turbine elements up to 1200° C. can today be realized.

A further increase to above 1300° C. is desirable but however has not been realizable with the workpieces used to date, especially with YSZ. The zirconium oxide deposited by plasma spraying or electron beam vaporization undergoes at temperatures above 1200° C. a phase transformation as well as accelerated sintering processes which can give rise to damage to the layer within the operating time. At the same thermal conductivity of the heat-insulating layer and the same layer thicknesses, higher surface temperatures also bring about higher temperatures in the adhesion promoting layer and the substrate. These temperature increases also contribute to an accelerated deterioration of the bond between the materials.

For these reasons there is a world wide search for new materials which can replace the partly stabilized zirconium oxide as a material for a heat-insulating layer.

From DE 100 56 617 (U.S. Pat. No. 6,821,656) it is known to use rare-earth perovskites as heat-insulating layers where La, Ce, Pr or Nd are present in the A position and Er, Tm, Yb or Lu are present in the B position. Such perovskites are characterized by a high melting point which lies, depending upon the material above about 1800° C. and especially even above 2000° C. Up to the region in which the material reaches its melting temperature, such a material shows no phase transformation and thus can be used for corresponding purposes, especially as a heat-insulating layer. A further characteristic of this aforementioned perovskite is its thermal expansion coefficient of typically greater than $8.5 \times 10^{-6}$ K$^{-1}$. Furthermore, its reduced thermal conductivity of less than 2.2 W/mK is advantageous for its use as a heat-insulating layer.

Perovskites with these characteristics function especially well as heat-insulating layers on a metal substrate since the thermal coefficient of expansion is matched and mechanical stresses between the two materials upon a temperature increase is limited and the reduced thermal conductivity usually limits overheating of the substrate.

Furthermore, a complex perovskite family of the general formula $A^{2+}(B^{2+}_{1/3}B^{5+}_{2/3})O_3$ is known. These perovskites, because of their temperature equalizing effect and their capacity to serve as low loss dielectrics have found use in many wireless communication devices (L. Dupont, L. Chai, P. K. Davies: "A- and B-site order in $(Na_{1/2}La_{1/2})(Mg_{1/3}Ta_{2/3})O_3$ perowskites"; A. S. Bhalla, R. Guo, R. Roy, "The perowskite structure—a review of its role in ceramic science and technology", Mat. Res. Innovat. (2000) Vol. 4., 3-26).

OBJECT OF THE INVENTION

The object of the invention is to provide a heat-insulating material for a heat-insulating layer which fulfills the requirements of a low thermal conductivity, a high thermal coefficient of expansion and a high sintering temperature simultaneously with a good phase stability up to temperatures in excess of 1300° C. Furthermore it is an object of the invention to provide thermally stressed components with such a thermal insulating layer.

SUMMARY OF THE INVENTION

The object is achieved with a heat-insulating material for a heat-insulating layer comprising a thermal protective layer of a heat-insulating layer with a complex perovskite pressure with a melting point above 2500° C. with a thermal expansion coefficient of at least $8 \times 10^{-6}$ K$^{-1}$ and with a sintering temperature of greater than 1400° C. This heat-insulating material is characterized by a complex perovskite structure in accordance with the following general formula

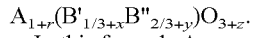

In this formula A represents at least one element from the group Ba, Sr, Ca, Be, B' represents at least one element of the group Mg, Ba, Sr, Ca, Be and B", represents at least one element of the group (TA, Nb). Alternatively the heat-insulating material can also have a composition according to the following formula:

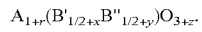

In this case, A can represent an element of the group Ba, Sr, Ca, Be, B' can represent at least one element of the group Al, La, Nd, Gd, Er, Lu, Dy, Tb. For B" at least one element fo the group (Ta, Nb) is selected. For both of the aforementioned compositions, such compounds should be included within the framework of this invention which have a slight deviation from the stoichiometry, than is such than $-0.1 < r,x,y,z < 0.1$.

It has been found that by contrast with many other materials of the perovskite class, these heat-insulating materials have an ordered form with a layered structure in which the layers of B' and B" alternate corresponding to the stoichiometry. Also three or more atoms in the B places, again strictly maintaining the stoichiometry, are possible, as is a mixture of the atoms in the A places. A certain deviation from the stoichiometry in the range of up to 5% is tolerable.

In addition, additives in an amount of several percent of such foreign cations which do not have ionic radii deviating excessively from those of the original cations are also possible.

The heat-insulating material has advantageously a high coefficient of thermal expansion in excess of $8 \times 10^{-6}$/K and a reduced tendency to sinter. Typical sintering temperatures of these materials usually lie above 1400° C.

All heat-insulating materials have a high phase stability to above 1350° C. The thermal conductivity of these perovskites is also highly satisfactory for their use as heat-insulating materials since the thermal conductivity of less than 3 W/m/K is especially low and satisfactory.

In addition, the melting points of these heat-insulating materials according to the invention usually lie above 2000° C. and in part also above 2500° C. In addition, with these classes of materials there arises an average to large difference between the cation masses which additionally contributes to a reduction in the thermal conductivity.

All of these characteristics make the above-described materials highly suitable for use as heat-insulating materials.

An especially advantageous representative of the group of the aforementioned heat-insulating materials is $Ba(Mg_{1/3}Ta_{2/3})O_3$. Other compounds which have been found to be especially suitable are $Sr(Al_{1/2}Ta_{1/2})O_3$, $Ca(Al_{1/2}Nb_{1/2})O_3$, $Sr(Sr_{1/3}Ta_{2/3})O_3$ or $Sr(La_{1/2}Ta_{1/2})O_3$.

A heat-insulating layer made from these materials has as rule a melting point of about 3000° C. and an extremely low sintering tendency.

SPECIFIC DESCRIPTION

In the following, the subject of the invention is described in greater detail in connection with an exemplary embodiment and without limiting the subject of the invention thereto.

1. Characteristics of the Heat-insulating Material.

An especially suitable heat-insulating layer is obtained advantageously from the heat-insulating material with the composition: $Ba(Mg_{1/3}Ta_{2/3})O_3$ which is fabricated by a solid state reaction of $BaCO_3$, $MgO$ and $Ta_2O_3$. After pressing the material is sintered at 1600° C. for several hours without noticeable shrinkage occurring. This material is thus suitable fur use as a heat-insulating layer where a low tendency of the material to sinter is desirable.

Advantageously, it is possible to make $Sr(Al_{1/2}Ta_{1/2})O_3$ or $Ca(Al_{1/2}Ta_{1/2})O_3$ from $Al_2O_3$ and $Ta_2O_3$ and $SrCO_3$ or $CaCO_3$. In general the elements barium, strontium, and calcium, preferably as carbonates and the remaining elements preferably as oxides can be provided in a mixture. The amounts of the individual compounds are selected so that they correspond to the aforementioned stoichiometric composition. Using a solid state reaction, the desired perovskite is obtained. Compositions with a slight deviation from the stoichiometry as previously mentioned can be made also by a suitable choice of the starting amounts.

With the thus produced $Ba(Mg_{1/3}Ta_{2/3})O_3$ a dilatometer test is carried out. The figure shows the results for this material. The heat-insulating material has a coefficient of thermal expansion at 1000° C. of $10.4 \times 10^{-6}$/K. This value is comparable with those for the standard material YSZ and is highly advantageous for a use of the material as a heat-insulating material.

2. Production of a Heat-insulating Layer System (HIS).

The heat-insulating material produced by the solid state reaction under 1. with the composition $Ba(Mg_{1/3}Ta_{2/3})O_3$ can be granulated by spray drying and then processed by a subsequent thermal spray process like atmospheric plasma spraying (APS) to an HIS system. In this case, nickel-based or cobalt based alloy are provided by vacuum plasma initially with an MCrAlY layer (M=Co, Ni) adhesion promoting layer (thickness of the layer about 50 to 500 μm). Then by atmospheric plasma spraying (APS) the heat-insulating layer is applied from the material according to the invention in a layer thickness of about 50 to 3000 μm. Alternatively, one can also make a two layer thermal insulating layer in that a first layer is applied from the YSZ material and the upper layer is then applied from the heat-insulating material (for example $Ba(Mg_{1/3}Ta_{2/3})O_3$ (BMT)) by deposition.

We claim:

1. In combination with a thermally stressed turbine component,
a heat-insulating layer on the component and having a melting point above 2500° C., a thermal expansion coefficient in excess of $8 \times 10^{-6}$ K$^{-1}$, and a sintering temperature greater than 1400° C., wherein the heat-insulating layer has a perovskite structure of the general formula $A_{1+r}(B'_{1/2+x}B''_{1/2+y})O_{3+z}$ in which:
A=at least one element of the group (Ba, Sr, Ca, Be),
B'=at least one element of the group (Al, La, Nd, Gd, Er, Lu, Dy, Tb),
B''=at least one element of the group (Ta, Nb), and
$-0.1 < r, x, y, z < 0.1$.

2. The combination defined in claim 1, further comprising between the surface of the component and the heat-insulating layer:
an intermediate layer of ceramic glass or metallic material.

3. The combination defined in claim 2 wherein the intermediate layer is a MCrAlY alloy where M=Co or Ni.

4. A method of protecting a thermally stressed turbine component, the method comprising:
applying to a surface of the turbine component a heat-insulating layer having a perovskite structure of the general formula $A_{1+r}(B'_{1/2+x}B''_{1/2+y})O_{3+z}$ in which:
A=at least one element of the group (Ba, Sr, Ca, Be),
B'=at least one element of the group (Al, La, Nd, Gd, Er, Lu, Dy, Tb),
B''=at least one element of the group (Ta, Nb), and
$-0.1 < r, x, y, z < 0.1$.

* * * * *